Nov. 27, 1923.
G. C. THOMAS, JR
1,475,524
CONNECTING DEVICE FOR ELECTRICAL CONDUITS, CABLES, AND THE LIKE
Filed May 10, 1922
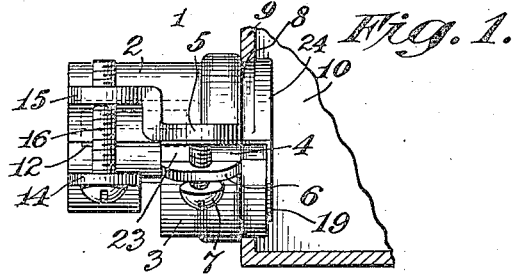
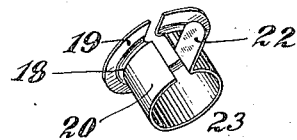
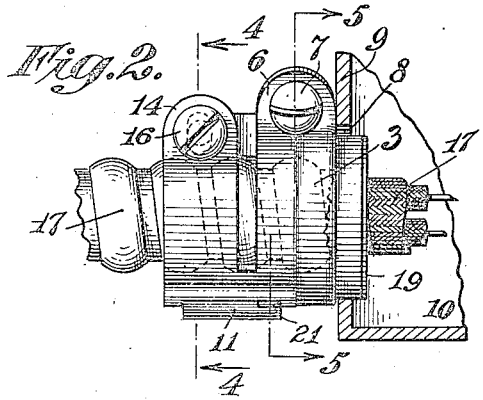
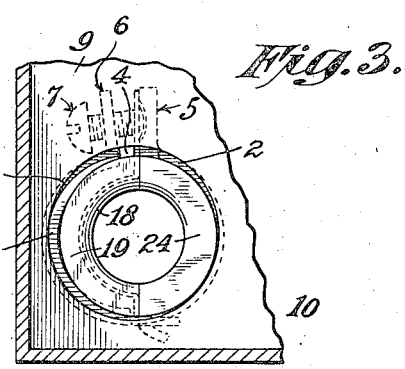
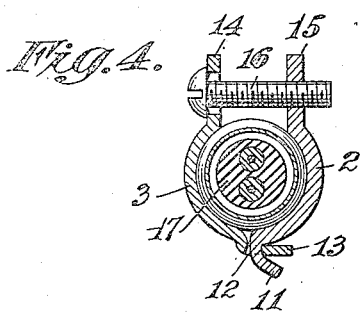
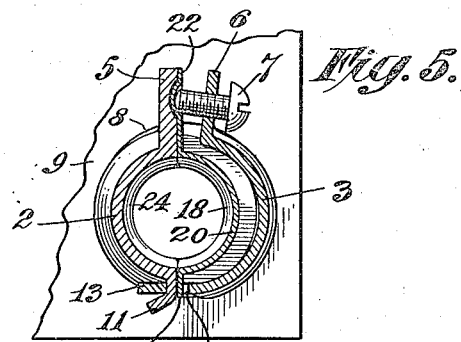
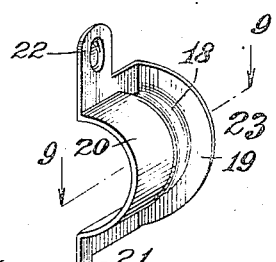
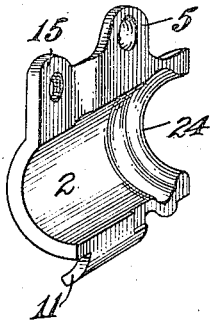
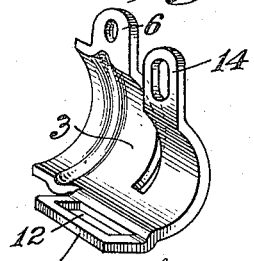
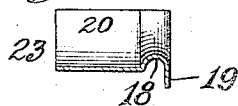

Patented Nov. 27, 1923.

1,475,524

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CONNECTING DEVICE FOR ELECTRICAL CONDUITS, CABLES, AND THE LIKE.

Application filed May 10, 1922. Serial No. 559,744.

*To all whom it may concern:*

Be it known that I, GEORGE C. THOMAS, Jr., a citizen of the United States, residing at Elizabeth, in the county of Union and State of New Jersey, have invented certain new and useful Improvements in Connecting Devices for Electrical Conduits, Cables, and the like, of which the following is a specification.

My invention relates to devices for connecting electrical conduits, cables and the like, to electric outlet boxes, or similar structures. It relates more particularly to connecting devices which are adjustable so that they may be used with box openings and with cables or conduits of different sizes.

My present invention is an improvement over the well known expansible type of connecting device, in which the parts of a split shell, or the parts of a shell having a plurality of parts, may be forced apart after the shell has been inserted in an opening in an outlet box to force the same into binding engagement with the edges of the opening. When the shell is so expanded the parts draw apart, thus exposing the conduit or cable along a longitudinal slit or opening. This slit widens with the expansion of the device. The presence of this opening, which also traverses the bushing portion of the connector, increases the fire risk and is very objectionable. Moreover, the separated edges of the two parts of the connector are apt to wear into and abrade the insulation of the cable.

It is one of the aims of my invention to overcome the objectionable features of a connector of the above type, and to provide a connector which provides means for preventing the exposure of the cable or conduit when the connector is expanded. Another object of my invention is to provide an expansible connector which is inexpensive to construct and efficient in operation, and one which provides both a continuous terminal bushing and a continuous protective covering about the conduit or cable irrespective of the expansion of the connector. Other objects will be in part obvious and in part pointed out hereinafter.

In accordance with my invention, in said well known type of connector I place a separate terminal bushing and sleeve member, which may be stamped of suitable metal. In my preferred form of construction this sleeve member is substantially semi-circular and fits inside of one of the halves of the connector, somewhat in the manner of a lining, and cooperates with the other half of the connector to form therewith, and irrespective of expansion of the connector, a continuous annular terminal bushing and also a continuous protecting covering for a conduit or cable passed through the connector. The sleeve member, however, may form a complete circle, in which case it carries the complete bushing and no bushing is required on either of the connector halves. In either modification the sleeve member is so arranged that it is securely held in cooperating position by means of the screw whereby the connector is expanded and clamped in the conduit opening of an outlet box.

In order that a clearer understanding of my invention may be had, attention is hereby directed to the accompanying drawing forming a part of this application and illustrating one possible embodiment of my invention. In the drawings, Fig. 1 is a top plan view of a connector embodying the preferred form of my invention mounted in a box, the cable being omitted; Fig. 2 is a side elevation of the connector mounted in the box, but showing the cable clamped in place; Fig. 3 is an end view of Fig. 2, the cable being omitted; Fig. 4 is a transverse cross section taken on the line 4—4 of Fig. 2, and shows the means for clamping the cable to the connector; Fig. 5 is a transverse cross section taken on the line 5—5 of Fig. 2 with the cable omitted, and showing means for clamping the connector to the box and the means of providing a continuous terminal bushing and protective covering, even though the connector is expanded; Fig. 6 is a perspective view of one of the parts comprising my improved connector; Fig. 7 is a perspective view of another part of the connector; Fig. 8 is a perspective view of another part of the connector; Fig. 9 is a horizontal section taken on the line 9—9 of Fig. 6; and Fig. 10 is a perspective view of a modified form of the sleeve member of my connector.

Referring to the drawings, the expansible shell 1 is formed of suitable metal, as by casting or stamping, and may comprise a split sleeve portion having two halves, 2 and 3, which are separated along the cut 4.

The adjacent edges of the sleeve portions 2 and 3 are provided with outwardly extending lugs 5 and 6, one of which, 6, is provided with a screw threaded opening, in which is mounted a screw 7, the end of which is adapted to bear against the opposite lug 5 as an abutment. By turning the screw, the parts of the sleeve may be separated so that their end portions will be firmly clamped against the periphery of an opening 8 in the wall 9 of an outlet box or similar structure 10 and to which it is desired to secure the connector. Opposite the slit 4 the sleeve portion 2 has a tongue 11 pivotally interlocking in a recess 12 provided in a lug or flange 13 on sleeve portion 3, although, if desired, the parts 2 and 3 may be made in one piece of suitably resilient metal. The usual cable-clamping means may be provided on shell 1. These may comprise the two lugs 14 and 15 adapted to be moved toward or from each other by means of screw 16. By turning the screw 16, the cable 17 may be securely clamped in place in the connector. So far the construction described is well known.

In my improved connector I include in the above construction a sheet metal member 23 which in my preferred embodiment is shaped to the contour of the inner surface of the sleeve portion 3 and at one end has an inwardly extending bead 18 terminating in an outwardly extending flange 19 constituting together a semi-circular terminal bushing. Rearwardly of the flange 19 member 23 in this form comprises a semi-circular sleeve portion 20 which cooperates with the sleeve portion 2 to form therewith a continuous protective covering about the cable. One edge of this member 23 is preferably provided with a tongue 21 which interlocks within the recess 12 of the lug 13 of sleeve portion 3, and at its opposite side member 23 has an outwardly extending ear 22 which seats between the end of screw 7 and lug 5, so that both edges of member 23 will be firmly clamped against sleeve portion 2 irrespective of the relative adjustment between sleeve portions 2 and 3 and the expansion of the connector.

It will be readily apparent that the bead 18 and flange 19 of supplementary member 23 cooperate with the bushing portion 24 of the sleeve portion 2 to form a continuous bushing for the cable irrespective of the amount of separation between the sleeve portions 2 and 3 when the connector is expanded. Similarly, the sleeve portion 20 of the supplementary member 23 extends about one-half of the cable and cooperates with the sleeve portion 2 which extends about the other half of the cable to form a continuous protective covering about this portion of the cable irrespective of the expansion of the connector. Member 23 extends across the slit 4 at all times and is held in place continuously by screw 7.

As shown in Fig. 10, supplementary member 23 may assume a form in which both the sleeve portion 20 and the terminal bushing portion, provided by bead 18 and flange 19, are circular instead of semi-circular. When this member is associated with a shell it forms a complete circle inside of the shell with both its sleeve portion 20 and its terminal bushing portion completely encircling a cable or conduit passed through the shell. With this form of supplementary member neither of the shell parts 2 or 3 require a bushing portion.

It is to be noted that my improved supplementary protecting strip may be readily and easily associated with adaptors and connectors heretofore produced, and when used, the manner of attaching the connector to the outlet box and the method of connecting the cable to the connector are the same as heretofore.

As many changes could be made in the above construction, and as many different embodiments of this invention could be made without departing from the scope thereof, it is intended that all the matter contained in the above description or shown in the accompanying drawings be interpreted as illustrative and not in a limiting sense.

What I claim is:—

1. In connecting devices, the combination with an expansible shell comprising two separable parts adapted to bind against the periphery of a conduit opening in which the device is inserted, and means for expanding said shell, of a supplementary member cooperating with a portion of said shell and forming with said portion, and irrespective of the separation of said parts, a covering completely encircling an electrical conduit or cable passed through said shell.

2. In connecting devices, the combination with an expansible shell comprising two separable parts and having a terminal bushing portion, of a supplementary member having a terminal bushing portion cooperating with said bushing on said shell and forming therewith, and irrespective of the separation of said parts, a terminal bushing completely encircling an electrical cable passed through said shell.

3. In connecting devices, the combination with an expansible shell comprising two separable members, both having wall-engaging portions and one having a sleeve portion and a terminal bushing portion, of a supplementary member having a sleeve portion and a bushing portion cooperating respectively with the sleeve and bushing of said shell member, and forming therewith, irrespective of expansion of said shell, a sleeve and a terminal bushing both completely encircling an electrical cable passed through said shell.

4. In connecting devices, the combination with an expansible shell comprising two separable members, both having wall-engaging portions, and one having a sleeve portion and a terminal bushing portion, of means comprising a supplementary member having a sleeve portion and a bushing portion cooperating respectively with the sleeve and bushing of said shell member, to form, irrespective of expansion of said shell, a sleeve and a terminal bushing both completely encircling an electrical cable passed through said shell, and means engaging both said shell members and said supplementary member, for simultaneously expanding said shell and maintaining said supplementary member in cooperating position with respect to said sleeve and bushing of said shell member.

5. In connecting devices, the combination with an expansible shell comprising two separable members, both having wall engaging portions, and one having a sleeve portion and a terminal bushing portion, of means comprising a supplementary member having a sleeve portion and a bushing portion cooperating respectively with the sleeve and bushing of said shell member, to form, irrespective of expansion of said shell, a sleeve and a terminal bushing both completely encircling an electrical cable passed through said shell, and means engaging both said shell members and said supplementary member, for simultaneously expanding said shell and maintaining said supplementary member in cooperating position with respect to said sleeve and bushing of said shell member, said means, including a lug on said cooperating shell member, and a contiguous ear on said supplementary member and a screw mounted for adjustment on said other shell member clamping said ear against said lug.

6. In connecting devices, the combination with an expansible shell comprising two separable members, of a supplementary member having a terminal bushing portion, and means engaging said expansible shell and said supplementary member for simultaneously expanding said shell and maintaining said supplementary member in its position within said shell.

7. In connecting devices, the combination with an expansible shell comprising two separable members, of a separate supplementary member having a curved sleeve portion within said shell and protectively covering an electrical cable or conduit passed through said shell.

8. In connecting devices, the combination with an expansible shell comprising two separable members, of a separate supplementary member having a curved sleeve portion within said shell and protectively covering an electrical cable or conduit passed through said shell, and having a bushing portion between said shell and said cable.

9. A separate protective device for connecting devices which have a slit so as to be expansible and have expanding means, comprising a metallic member having a curved sleeve portion and an ear, said member being insertible within said connecting device with its sleeve portion covering said slit and with said ear engaging said expanding means, whereby said sleeve portion is held in position covering said slit irrespective of the expansion of said device and the widening of said slit.

This specification signed and witnessed this 5 day of May, 1922.

GEORGE C. THOMAS, Jr.